United States Patent
Lambert

(10) Patent No.: US 12,228,078 B2
(45) Date of Patent: Feb. 18, 2025

(54) SYSTEM FOR CONDITIONING FUEL FOR SUPPLYING AN AIRCRAFT TURBOMACHINE, AIRCRAFT AND METHOD OF USE

(71) Applicant: SAFRAN, Paris (FR)

(72) Inventor: Pierre-Alain Marie Cyrille Lambert, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/291,780

(22) PCT Filed: Jul. 18, 2022

(86) PCT No.: PCT/EP2022/070031
§ 371 (c)(1),
(2) Date: Jan. 24, 2024

(87) PCT Pub. No.: WO2023/011900
PCT Pub. Date: Feb. 9, 2023

(65) Prior Publication Data
US 2024/0369021 A1 Nov. 7, 2024

(30) Foreign Application Priority Data
Aug. 3, 2021 (FR) .................................. FR2108448

(51) Int. Cl.
*F02C 7/224* (2006.01)
*F02C 3/22* (2006.01)
*F02C 9/32* (2006.01)

(52) U.S. Cl.
CPC ................ *F02C 7/224* (2013.01); *F02C 3/22* (2013.01); *F02C 9/32* (2013.01)

(58) Field of Classification Search
CPC ............... F02C 3/22; F02C 7/224; F02C 9/32
See application file for complete search history.

(56) References Cited

U.S. PATENT DOCUMENTS 2,955,609 A * 10/1960 Gaubatz ............... F02K 3/10
137/565.29
5,490,387 A * 2/1996 Bisson ................. F02C 7/236
60/734

(Continued)

FOREIGN PATENT DOCUMENTS

EP 2925981 10/2015

OTHER PUBLICATIONS

International Search Report for PCT/EP2022/070031, dated Aug. 31, 2022, 4 pages.
French Search Report for FR2108448 dated Apr. 4, 2022, 2 pages.

*Primary Examiner* — Lorne E Meade
(74) *Attorney, Agent, or Firm* — RANKIN, HILL & CLARK LLP

(57) ABSTRACT

A system for conditioning fuel configured to supply a main turbomachine, based on fuel from a cryogenic tank, comprising a pump configured to operate at a predetermined constant speed, at least one heat exchanger, a supply member for supplying the main turbomachine with a fuel flow, the supply member being configured to deliver a nominal flow rate when the pump is operating at a predetermined constant speed, at least one buffer tank, a first valve for controlling the supply of fuel to the buffer tank, a second valve for controlling the distribution of the fuel flew flow and a regulating device that is configured to open the second valve when the setpoint flow rate is higher than the nominal flow rate.

12 Claims, 8 Drawing Sheets

(56) References Cited

U.S. PATENT DOCUMENTS

| | | | |
|---|---|---|---|
| 9,209,730 B2 * | 12/2015 | Scipio | F02C 9/46 |
| 9,347,376 B2 * | 5/2016 | Popovic | F02C 7/224 |
| 9,932,124 B2 * | 4/2018 | Kamath | F02C 9/40 |
| 10,141,814 B2 * | 11/2018 | Caristan | F02C 1/002 |
| 10,247,110 B2 * | 4/2019 | Scipio | F01D 25/32 |
| 10,954,893 B2 * | 3/2021 | Salley | F02D 41/062 |
| 11,668,243 B2 * | 6/2023 | Muldoon | F02C 7/262 |
| | | | 60/736 |
| 2010/0038907 A1 * | 2/2010 | Hunt | E21B 41/0085 |
| | | | 290/43 |
| 2014/0318134 A1 | 10/2014 | Popovic | |

* cited by examiner

SYSTEM FOR CONDITIONING FUEL FOR SUPPLYING AN AIRCRAFT TURBOMACHINE, AIRCRAFT AND METHOD OF USE

TECHNICAL FIELD

The present invention relates to the field of aircraft comprising turbomachines supplied by fuel stored in a cryogenic tank.

It is known to store fuel, in particular hydrogen, in liquid form to limit the bulk and mass of the tanks of the aircraft. For example, the fuel is stored at a temperature of about 20 to 22 Kelvin (−253 to −251° C.) in a cryogenic tank of the aircraft.

In order to be able to be injected into the combustion chamber of a turbomachine, the fuel must be conditioned, i.e. pressurized and heated, in order to enable optimum combustion. A conditioning is for example necessary to reduce the risk of icing of the water vapor contained in the air that circulates in the turbomachine, in particular, at the level of the fuel injectors of the turbomachine. In reference to FIG. 1, a conditioning system SCAA according to the prior art is shown comprising a fuel circuit 100 connected at the inlet to a cryogenic tank R1 and at the outlet to the combustion chamber CC of a turbomachine T. A fuel flow Q circulating from upstream to downstream in the fuel circuit 100 successively passes through a mechanical pump 101 and a heating module 102.

In practice, for pumping, a mechanical pump 101 of the displacement or centrifugal type is generally used. Such a mechanical pump 101 has many disadvantages from an efficiency standpoint. A mechanical pump 101 cannot operate over a wide flow rate/pressure range for high efficiency. Also, in practice, it is necessary to use a mechanical pump 101 of which the operating point is not optimal and which requires moving away from the recommended operating range of said mechanical pump 101, which increases the stresses applied to the mechanical pump 101 and reduces its efficiency. Such a mechanical pump 101 cannot therefore adapt its flow rate optimally according to the needs of the turbomachine T. For example, for a civil transport aircraft, the setpoint flow rate of the turbomachine T in a take-off phase may be more than three times higher than the setpoint flow rate in a cruise phase.

In addition, the discharge pressure of a mechanical pump 101 decreases as the flow rate increases, which is contrary to the need of the turbomachine T for which the injection pressure and the injected flow rate both increase with the thrust generated.

The invention thus aims to eliminate at least some of these disadvantages by proposing a novel fuel conditioning system enabling a compression and a heating with better efficiency and greater operability.

A system for supplying gaseous fuel to a gas turbine from a liquid fuel source is known in the prior art by document U.S. Pat. No. 20140318134A1.

SUMMARY

The invention relates to a system for conditioning fuel configured to supply an aircraft turbomachine, referred to as main turbomachine, from fuel from a cryogenic tank, the main turbomachine having a setpoint fuel flow rate that is a function of the aircraft movement phase, the conditioning system comprising:

- a fuel circuit connected at the inlet to the cryogenic tank and at the outlet to the main turbomachine,
- a pump configured to circulate an upstream to downstream fuel flow in the fuel circuit, the pump being configured to operate at a predetermined constant speed,
- at least one heat exchanger configured to transmit calories from a hot source to the fuel flow via a heating circuit,
- a supply member of the main turbomachine with a fuel flow, the supply member defining a predetermined flow cross-section, the supply member being configured to provide a nominal supply flow rate when the pump is operating at a predetermined constant speed,
- at least one buffer tank configured to supply the main turbomachine in parallel with the supply member, the buffer tank being configured to be supplied by a fuel flow,
- at least one first valve for controlling the supply of the fuel flow to the buffer tank (4),
- at least one second control valve for the distribution of the fuel flow from the buffer tank, and
- a regulating device configured to open the second valve when the setpoint flow rate is higher than the nominal supply flow rate.

Hereinafter, a predetermined constant speed/flow rate is defined as a speed/flow rate the variation of which does not exceed +/−10% with respect to a determined speed/flow rate value.

Thanks to the invention, a pump of simple and inexpensive design may be used since it operates at a predetermined constant speed. Advantageously, the conditioning system may follow the setpoint flow rate by dynamically regulating the fuel distribution of the buffer tank, in particular during a take-off phase wherein the fuel requirements are high.

Preferably, the heat exchanger is positioned upstream of the buffer tank. Alternatively, the heat exchanger is positioned downstream of the buffer tank.

Preferably, the regulating device is configured to close the second valve when the setpoint flow rate is lower than the nominal supply flow rate. Thus, the fuel from the buffer tank is used economically, preferably, only during a take-off phase.

More preferably, the regulating device is configured to close the first valve when the setpoint flow rate is higher than the nominal supply flow rate. Thus, the supply member makes it possible to provide the nominal supply flow rate.

Preferably, the first valve having a configurable degree of opening, the regulating device is configured to vary the degree of opening of the first valve according to a comparison between the nominal supply flow rate and the setpoint flow rate. Preferably, the degree of opening obeys a determined opening law f of the type f(d6n−dT). Advantageously, the excess fuel is stored dynamically in the buffer tank, which is very advantageous. Thus, when the difference is small, the buffer tank fills up gently to absorb the excess flow. This prevents the pump from being used at an excessively high speed. Conversely, when the difference is substantial, the buffer tank fills quickly to absorb the excess flow. The buffer tank thus has enough fuel to ensure a new take-off phase.

Alternatively, the regulating device is configured to open the first valve according to a first degree of opening when the difference between the nominal supply flow rate and the setpoint flow rate is lower than a predetermined difference. Thus, when the difference is small, the buffer tank fills up gently to absorb the excess flow. This prevents the pump from being used at an excessively high speed.

Alternatively, the regulating device is configured to open the first valve according to a second degree of opening, higher than the first degree of opening, when the difference between the nominal supply flow rate and the setpoint flow rate is higher than the predetermined difference. Thus, when the difference is substantial, the buffer tank fills up quickly to absorb the excess flow. The buffer tank thus has enough fuel to ensure a new take-off phase.

According to one aspect of the invention, the system for conditioning fuel comprises at least one auxiliary heat exchanger mounted between the second valve and the main turbomachine so as to heat the fuel flow prior to the injection thereof into the main turbomachine. Thus, the cooling of the fuel from the buffer tank after the thermodynamic expansion thereof may be compensated in such a way as to inject fuel into the main turbomachine with an optimal, preferably constant temperature.

Preferably, the hot source is an auxiliary power generation device supplied by the fuel circuit. Thus, the heat source is autonomous.

Preferably, the auxiliary power generation device is configured to operate at a constant speed, in particular over a reduced operating range. This reduces its cost and size.

Preferably, the auxiliary power generation device is an auxiliary turbomachine or a fuel cell. A fuel cell has a high efficiency over a small operating range, which makes its use very relevant in this context.

Preferably, the system for conditioning fuel comprises at least one propulsion member and a drive system of said propulsion member, the drive system being configured to be supplied by the main turbomachine and by the auxiliary power generation device. The power of the auxiliary power generation device may be used to reduce the power of the main turbomachine, which may thus have a smaller and less expensive structure.

The fuel is preferably dihydrogen. Such a fuel is particularly suitable for a fuel cell.

Preferably, the nominal supply flow rate is determined to be higher than the setpoint flow rate in the cruising phase and lower than the setpoint flow rate in the take-off phase. Thus, there is always surplus flow to fill the buffer tank in the cruising phase.

The invention also relates to an aircraft comprising a system for conditioning such as presented previously.

The invention also relates to a method for supplying fuel to an aircraft turbomachine, referred to as main turbomachine, from fuel from a cryogenic tank, the main turbomachine having a setpoint fuel flow rate, which is according to the phase of movement of the aircraft, the method comprising steps consisting of:
 circulating a fuel flow upstream and downstream in a fuel circuit by means of a pump operating at a predetermined constant speed, the pump providing a nominal supply flow rate,
 transmitting calories from a hot source to the fuel flow via a heating circuit,
 emptying a buffer tank, supplied by the fuel circuit, when the setpoint flow rate is higher than the nominal supply flow rate.

Preferably, the method comprises a step consisting of supplying the buffer tank with fuel when the setpoint flow rate is lower than the nominal supply flow rate.

Preferably, the method comprises a step consisting of varying the supply of the buffer tank according to a comparison between the nominal supply flow rate and the setpoint flow rate.

The invention also relates to a method of using a system for conditioning fuel such as presented previously, the main turbomachine having a setpoint flow rate that is according to the phase of movement of the aircraft, the pump operating at a predetermined constant speed, the method comprising at least one step consisting of opening the second valve when the setpoint flow rate is higher than the nominal supply flow rate.

DESCRIPTION OF THE DRAWINGS

The invention will be better understood upon reading the following description, given as an example, and referring to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

Figure 1:
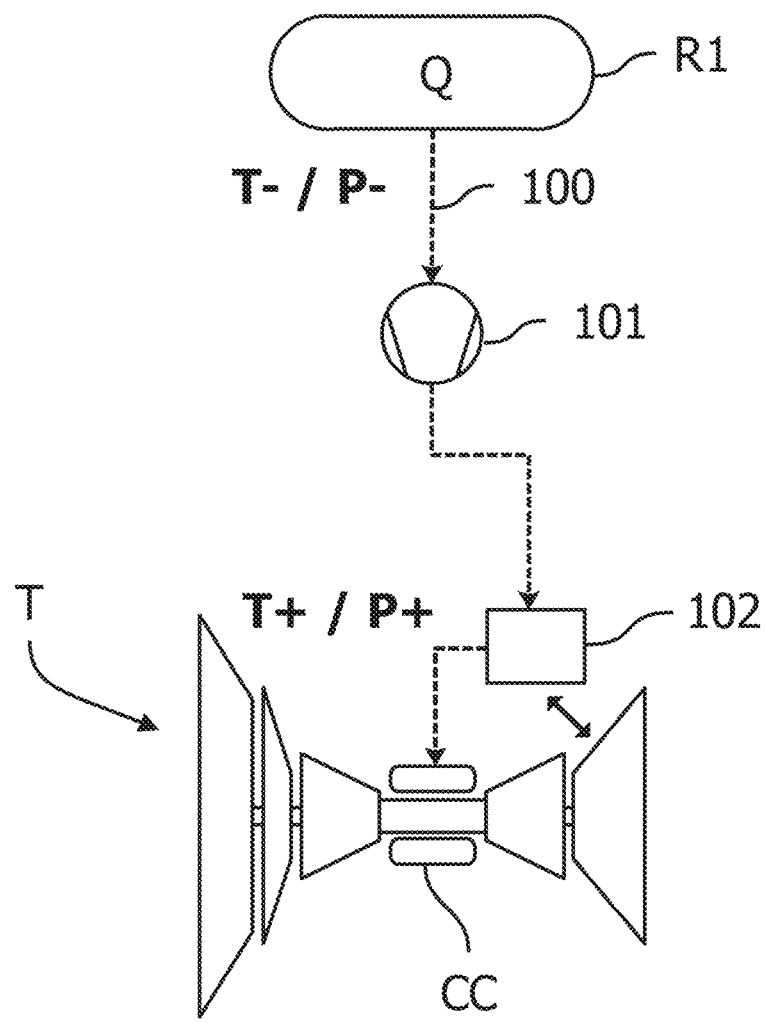
FIG. 1 is a schematic representation of a system for conditioning fuel according to the prior art.
Figure 2:
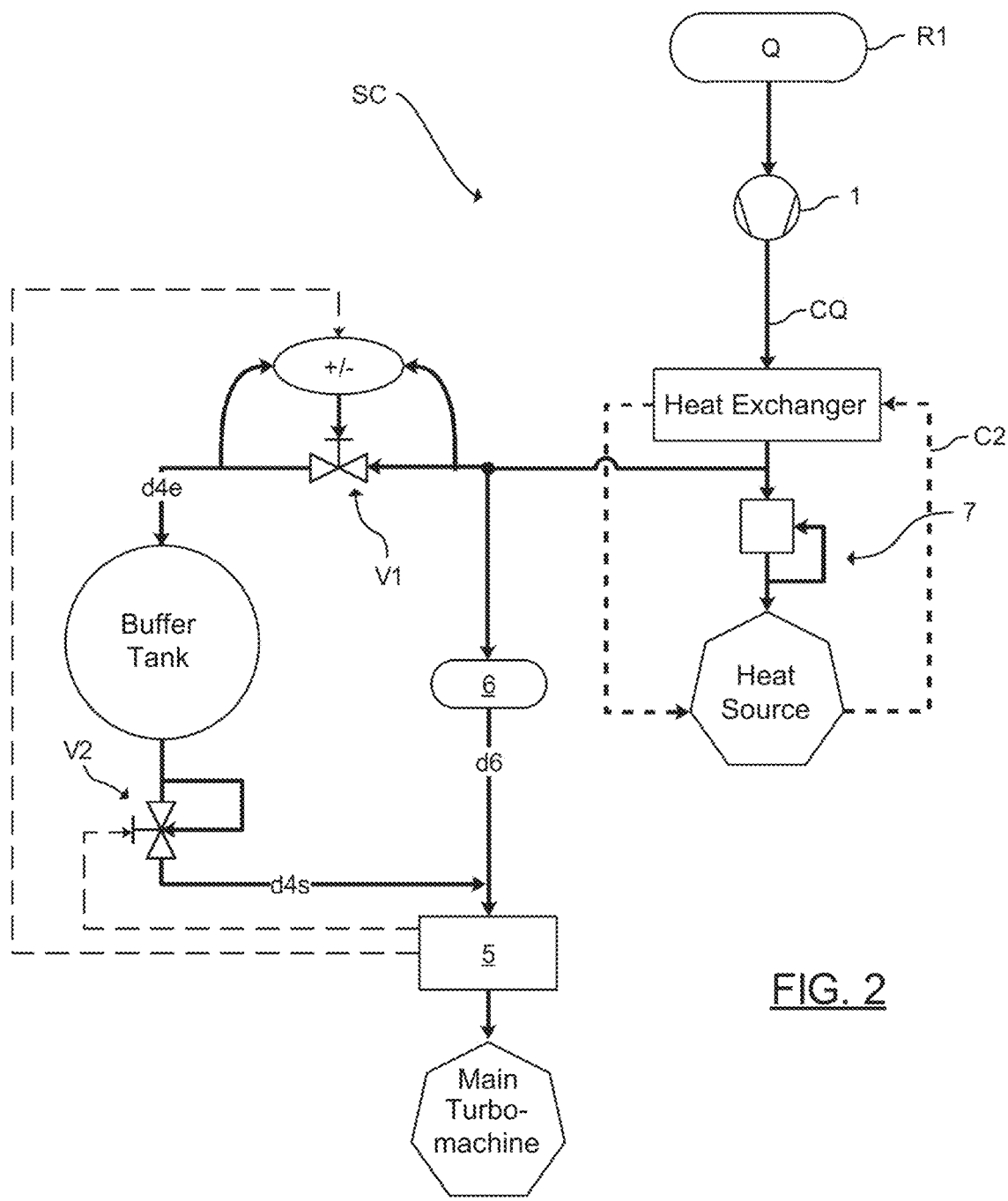
FIG. 2 is a schematic representation of a system for conditioning fuel according to a second embodiment of the invention, the heat exchanger being in the downstream position.

In reference to FIG. 2, a system for conditioning fuel SC is shown configured to supply an aircraft turbine engine, referred to as main turbomachine T, from fuel Q coming from a cryogenic tank R1. The main turbomachine T is configured to ensure the propulsion of the aircraft, in particular, by driving at least one propulsion device (not shown in FIG. 2).

The main turbomachine T has a setpoint flow rate dT of fuel Q which depends on the use phase of the main turbomachine T. Thus, in reference to FIG. 3, the setpoint flow rate dT is very high during a take-off phase S1, medium during a cruise phase S2 and low during a landing phase S3.

In this example, the fuel is liquid hydrogen but the invention applies to other types of fuel, for example, liquid methane or liquefied natural gas.

First Embodiment (FIG. 2)

According to a first embodiment, in reference to FIG. 2, the conditioning system SC comprises a fuel circuit QC (continuous line in FIG. 2) connected at the inlet to the cryogenic tank R1 and at the outlet to the main turbomachine T. The conditioning system SC also comprises a pump 1, preferably high pressure, configured to circulate a fuel flow Q from upstream to downstream in the fuel circuit CQ.

Preferably, the pump 1 is configured to operate at a constant speed, in particular, corresponding to a high efficiency. The pump 1 advantageously provides a constant overpressure. Such a constant speed makes it possible to generate a constant fuel flow rate by the supply member 6 as shall be presented below. Such a pump 1, with a limited operating range, has a high reliability, a small size and low cost.

In reference to FIG. 2, the conditioning system SC further comprises a heat exchanger 3 configured to transmit calories from a hot source to the fuel flow Q taken by the pump 1 in order to heat it to allow it to be optimally injected into the main turbomachine T.

In this example, the heat source is in the form of an auxiliary power generation device 2 that is configured to generate calories and supply them to the heat exchanger 3. In other words, the auxiliary power generation device 2 performs a heating function in order to increase the temperature of the fuel flow Q so that the latter may be injected into the main turbomachine T. In this example, the auxiliary power generation device 2 is directly supplied by the fuel circuit Q and is thus autonomous. The auxiliary power generation device 2 is supplied by a fraction of the heated fuel flow Q. In this example, the system for conditioning fuel SC comprises an expansion valve 7 configured to expand the fuel flow Q before supplying the auxiliary power generation device 2. Thus, the auxiliary power generation device 2 is optimally supplied.

Preferably, the calories from the auxiliary power generation device 2 are transferred to the fuel flow Q via a heating circuit C2, for example, a cooling circuit of the auxiliary power generation device 2 such as an oil circuit or an exhaust air circuit. By way of example, the calories generated by the auxiliary power generation device 2 may come from the waste heat of said auxiliary power generation device 2 or one of its cooling circuits (oil, etc.).

Preferably, the auxiliary power generation device 2 operates at a constant speed, in particular corresponding to a high efficiency. Its speed is determined to provide suitable heating. Such an auxiliary power generation device 2, having a limited operating range, has high reliability, small size and low cost.

According to one aspect, the auxiliary power generation device 2 is an auxiliary turbomachine and makes it possible to produce mechanical power that may be used by the aircraft. The exhaust gas or oil from the auxiliary turbomachine may be used in particular as a heating circuit C2. According to another aspect, the auxiliary power generation device 2 is a fuel cell, in particular, supplied with dihydrogen. Such a fuel cell 2 makes it possible to generate electrical power that may be used by the aircraft. Examples of use will be presented later.

The conditioning system SC further comprises a supply member 6 of the main turbomachine T with a heated fuel flow Q, the supply member 6 defining a predetermined flow cross-section. Preferably, the supply member 6 is an orifice having a predetermined flow cross-section. Advantageously, since pump 1 operates at a constant flow rate, the predetermined flow cross-section of the supply member 6 makes it possible to provide a supply flow rate d6 that is constant to the main turbomachine T when there is no other taking. Preferably, the flow rate of the pump 1 as well as the predetermined flow cross-section of the supply member 6 are determined so as to provide a nominal supply flow rate d6n, the latter being determined to be, on the one hand, lower than the setpoint flow rate of the turbomachine dT in the take-off phase S1 and, on the other hand, higher than the setpoint flow rate of the turbomachine dT in the cruising phase S2 but insufficient alone in the take-off phase S1. Thus, the nominal supply flow rate don is sufficient to meet the needs of the main turbomachine T in the cruising phase S2. Preferably, the nominal supply flow rate don is between 0% and 10% higher than the setpoint flow rate of the turbomachine dT in the cruising phase S2. Such a nominal supply flow rate don allows the speed of pump 1 to be reduced and therefore its size and cost to be reduced.

Still in reference to FIG. 2, the conditioning system SC comprises at least one buffer tank 4 configured to supply the main turbomachine T in parallel with the supply member 6. The buffer tank 4 is configured to be supplied by a heated fuel flow Q. Thus, the buffer tank 4 makes it possible to provide an additional flow rate to supplement the supply flow rate d6, in particular, in the take-off phase S1 as will be presented below.

The buffer tank 4, also referred to as "gas capacity", has the advantage of conditioning fuel Q in a gaseous state, which makes fuel Q available that may be made immediately available to the main turbomachine T.

In reference to FIG. 2, the conditioning system SC comprises a first valve V1 for controlling the supply of buffer tank 4 with heated fuel flow Q, positioned upstream of buffer tank 4, and a second valve V2 for controlling the distribution of the heated fuel flow Q from buffer tank 4, positioned downstream of buffer tank 4. The valves V1, V2 thus make it possible to respectively control the inlet and outlet of the heated fuel Q to adapt dynamically to the setpoint flow rate dT while pump 1 is operating at a constant speed. Thus, the first valve V1 makes it possible to control an inlet flow d4e from buffer tank 4 while the second valve V2 makes it possible to control an outlet flow d4s from buffer tank 4. Preferably, the second valve V2 comprises a sonic orifice enabling the flow rate in the second valve V2 to be made independent of downstream conditions. The first valve V1 has a configurable degree of opening as will be presented below.

In reference to FIG. 2, the conditioning system SC comprises a regulating device 5 configured to control the valves V1, V2. Preferably, the regulating device 5 is in the form of an electronic engine control unit and the valves V1, V2 are in the form of solenoid valves.

The regulating device 5 is in particular configured to:
open the second valve V2 when the setpoint flow rate dT is higher than the nominal supply flow rate don, and
close the second valve V2 when the setpoint flow rate dT is lower than the nominal supply flow rate d6n.

Figure 3:
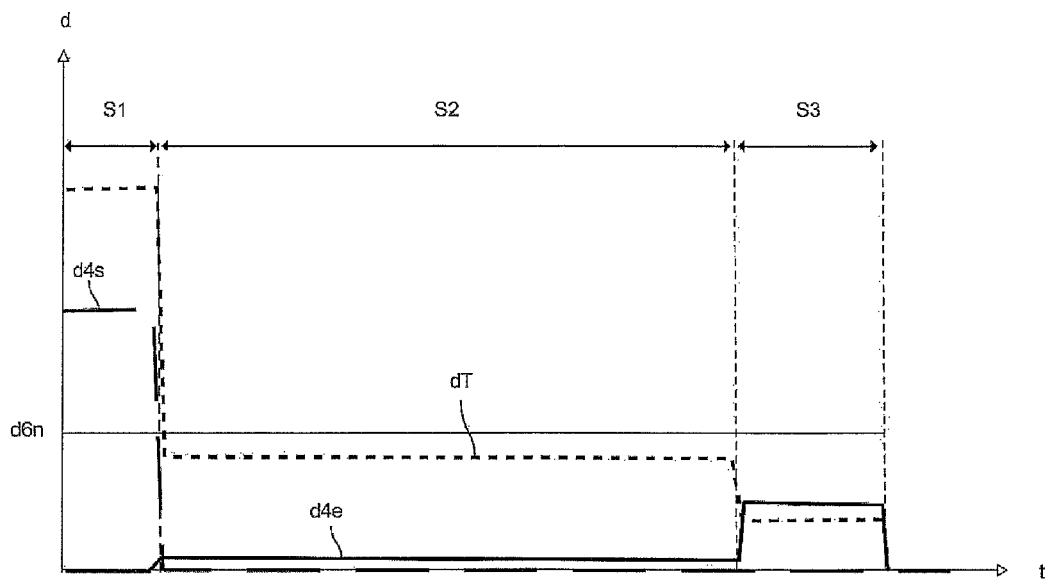
FIG. 3 is a schematic representation of the various fuel flow rates during the various phases of use of the main turbomachine.

Thus, the buffer tank 4 makes it possible to dynamically supplement and reactivate the supply device 6 to follow the setpoint flow rate dT. The second valve V2 is thus opened during the take-off phase S1 to increase the outlet flow d4s of the buffer tank 4 (FIG. 3). Preferably, the fuel flows from the supply member 6 and the buffer tank 4 are mixed prior to their injection in the main turbomachine T. The second valve V2 is inversely closed during the other phases S2, S3, the outlet flow d4s of buffer tank 4 then being zero (FIG. 3).

Preferably, the regulating device 5 is also configured to open/close the second valve V2 according to the pressure P4 (FIG. 4) and the temperature T4 (FIG. 5) in the buffer tank 4 in order to ensure an optimum outlet flow rate d4s.

The regulating device 5 is further configured to:
close the first valve V1 when the setpoint flow rate dT is higher than the nominal supply flow rate don,
vary the degree of opening of the first valve V1 according to a comparison between the nominal supply flow rate don and the setpoint flow rate dT.

Preferably, the degree of opening obeys a determined opening law f of the type f(d6n−dT). Advantageously, the surplus fuel is stored dynamically in buffer tank 4, which is very advantageous. Thus, when the difference is small, the buffer tank fills up gently to absorb the excess flow. This prevents the pump from being used at an excessively high speed. Conversely, when the difference is substantial, the buffer tank fills quickly to absorb the excess flow. The buffer tank 4 thus has sufficient fuel to ensure a new take-off phase.

Alternatively, the regulating device 5 is configured to
open the first valve V1 according to a first degree of opening when the difference between the nominal supply flow rate don and the setpoint flow rate dT is lower than a predetermined difference e (d6n−dT<e or d6n−e<dT<d6n) and
open the first valve V1 by a second degree of opening, higher than the first degree of opening, when the difference between the nominal supply flow rate don and the setpoint flow rate dT is higher than a predetermined difference e (d6n−dT>e or dT<d6n−e).

In this example, the difference e is predetermined to control an opening of the first valve V1 according to a first degree of opening during the cruising phase S2 and to control an opening of the first valve V1 according to a second degree of opening during the landing phase S3. Thus, the lower the setpoint flow rate dT is, the more the first valve V1 may be opened to fill the buffer tank 4.

The first valve V1 is closed during the take-off phase S1 then opened according to a first degree of opening during the cruising phase S2 then according to a second degree of opening (greater than the first) during the landing phase S3 in order to optimize the filling of the buffer tank 4 when the demand is lower. Thus a buffer tank 4 that is sufficiently filled is always available for a new take-off phase S1.

Figure 4:
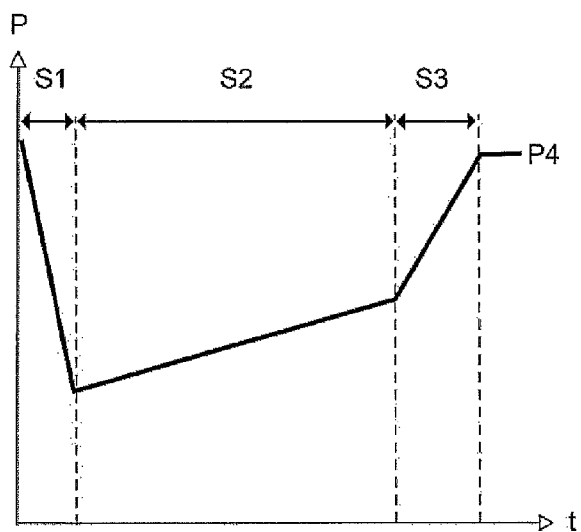
FIG. 4 is a schematic representation of the change in the pressure in the buffer tank during the various phases of use of the main turbomachine.
Figure 5:
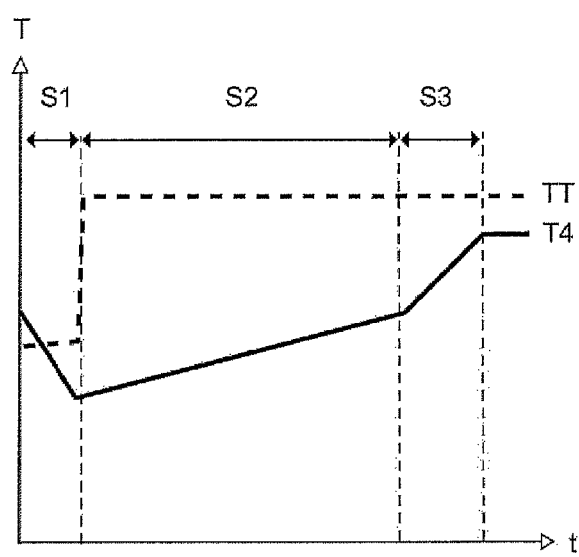
FIG. 5 is a schematic representation of the various temperatures during the various phases of use of the main turbomachine.

In reference to FIG. 4, the pressure P4 in the buffer tank 4 thus decreases during the take-off phase S1, then may increase slightly during the cruising phase S2 before increasing substantially during the landing phase S3. During the take-off phase S1, the pressure P4 in the buffer tank 4 decreases due to the thermodynamic expansion of the fuel flow Q, resulting in a drop in the temperature T4 of the buffer tank 4 (FIG. 5). The temperature T4 then rises slightly during the cruise phase S2 before rising substantially during the landing phase S3 due to the filling of the buffer tank 4.

Figure 6:
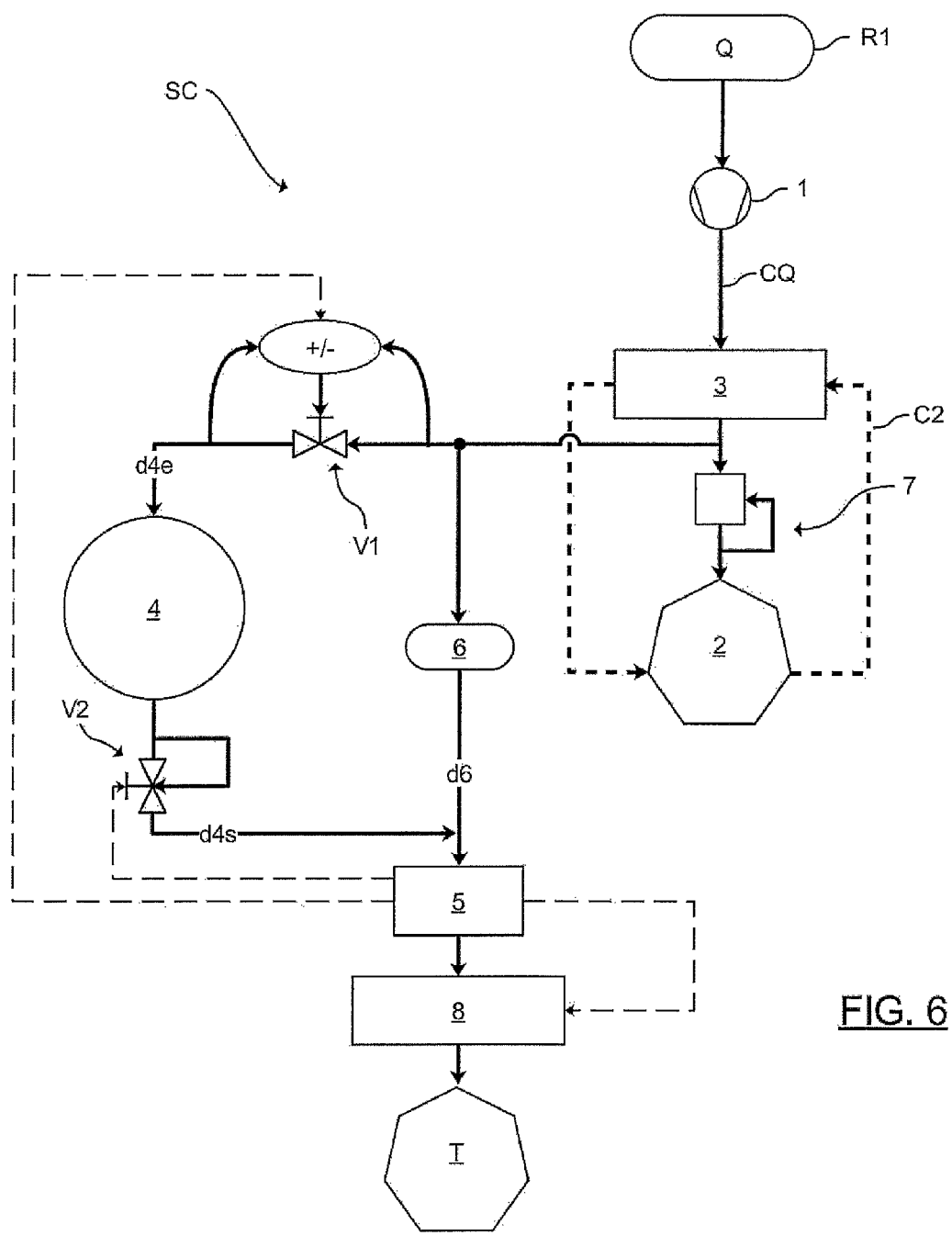
FIG. 6 is a schematic representation of a system for conditioning fuel according to a second embodiment of the invention.

Second Embodiment (FIG. 6)

In reference to FIG. 6, a second embodiment of the system for conditioning fuel SC is shown. For the sake of clarity and conciseness, the elements that are common or analogous to the first embodiment are not presented again.

As shown in FIG. 6, the system for conditioning fuel SC comprises an auxiliary heat exchanger 8 mounted between the second valve V2 and the main turbomachine T configured to heat the fuel flow Q from the buffer tank 4 and from the supply member 6 such that the temperature of the fuel at injection into the turbomachine T, referred to as the turbomachine temperature TT, is substantially constant during the cruise phase S2.

Thus, the temperature drop T4 of the fuel flow Q from the buffer tank 4, linked to the thermodynamic expansion thereof, may be conveniently compensated in order to supply the main turbomachine T. The auxiliary heat exchanger 8 may provide calories from various heat sources, in particular, from the main turbomachine T. Preferably, the auxiliary heat exchanger 8 is configurable, in particular by the regulating device 5, so as to make it possible to regulate the supply of calories according to the phases of use.

Figure 7:
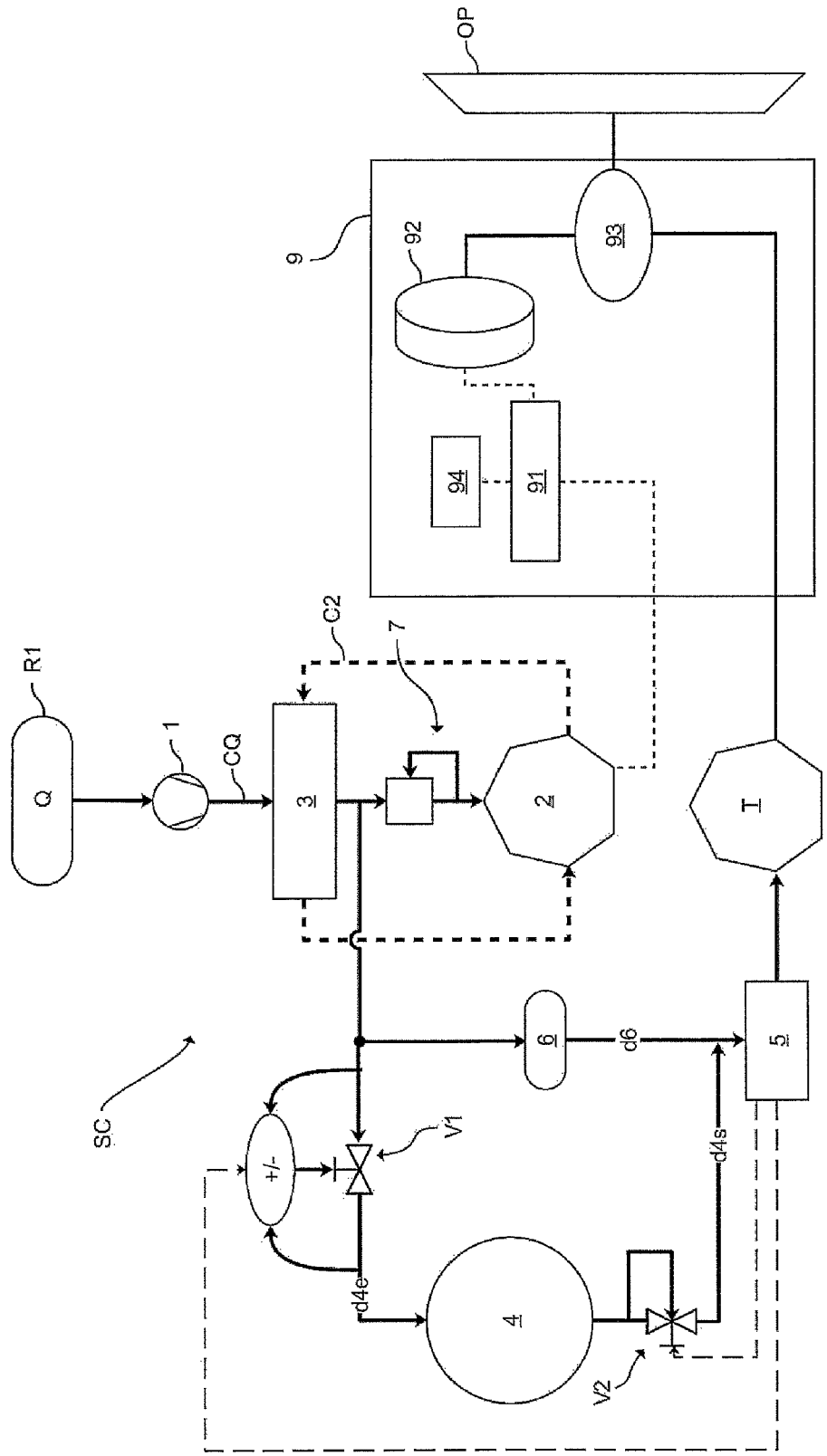
FIG. 7 is a schematic representation of a system for conditioning fuel according to a third embodiment of the invention.

Third Embodiment (FIG. 7)

In reference to FIG. 7, a third embodiment of the system for conditioning fuel SC is shown. For the sake of clarity and conciseness, the elements that are common or analogous to the first embodiment are not presented again.

In the first embodiment, the main turbomachine T is preferably connected to a propulsion member that it drives, for example, a propeller or a fan.

In reference to FIG. 7, the system for conditioning fuel SC comprises a propulsion member OP and a drive system 9 of said propulsion member OP. The drive system 9 is configured to be supplied by the main turbomachine T and by the auxiliary power generation device 2. Thus, the energy generated by the auxiliary power generation device 2 is used to participate in the propulsion. This advantageously makes it possible to reduce the size of the main turbomachine T.

In the example of FIG. 7, the auxiliary power generation device 2 is a fuel cell that provides electrical power. For this purpose, the drive system 9 comprises an electrical network 91 which supplies an electric motor 92 in order to convert the electrical power into mechanical torque. The drive system 9 further comprises a transmission box 93 configured to provide an overall mechanical torque to the propulsion member OP from the mechanical torques of the electric motor 92 and the main turbomachine T. Preferably, an electrical battery 94 is provided to allow for storing the excess electrical energy or providing supplementary electrical power during change of speed phases.

When the auxiliary power generation device 2 is an auxiliary turbomachine, the drive system 9 may advantageously take the form of a transmission box configured to provide an overall mechanical torque to the propulsion member OP from the mechanical torques of the auxiliary turbomachine and the main turbomachine T.

Figure 9:
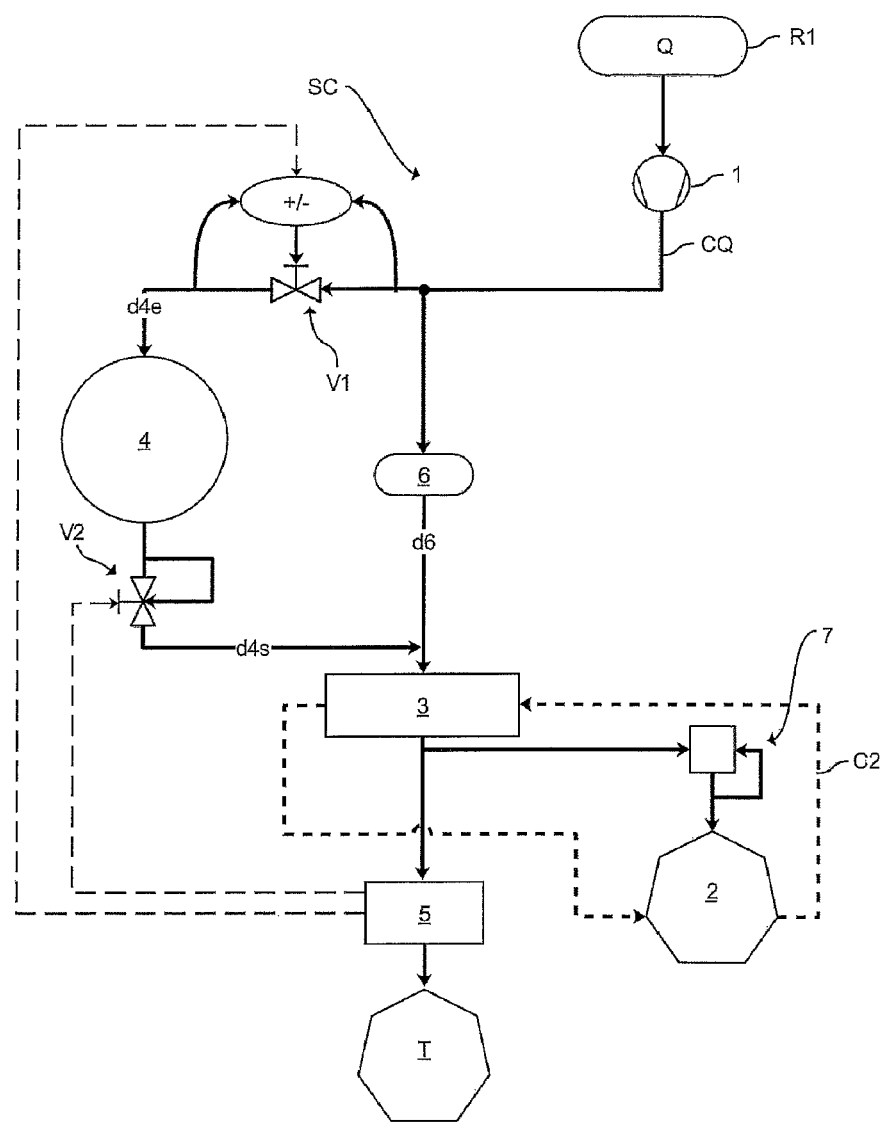
FIG. 9 is a schematic representation of a system for conditioning fuel according to an alternative of the first embodiment of the invention, the heat exchanger being in the upstream position.

A heat exchanger 3 positioned upstream of buffer tank 4 (FIG. 2) was previously presented, but it goes without saying that it could be positioned downstream of said buffer tank 4 (FIG. 9). This advantageously makes it possible to store the fuel in the buffer tank 4 in a liquid state with less space taken up. When the heat exchanger 3 is positioned downstream of said buffer tank 4, the auxiliary power generation device 2 is supplied with heated fuel. In other words, the auxiliary power generation device 2 is positioned downstream of the heat exchanger 3 as shown in FIG. 9.

Figure 8:
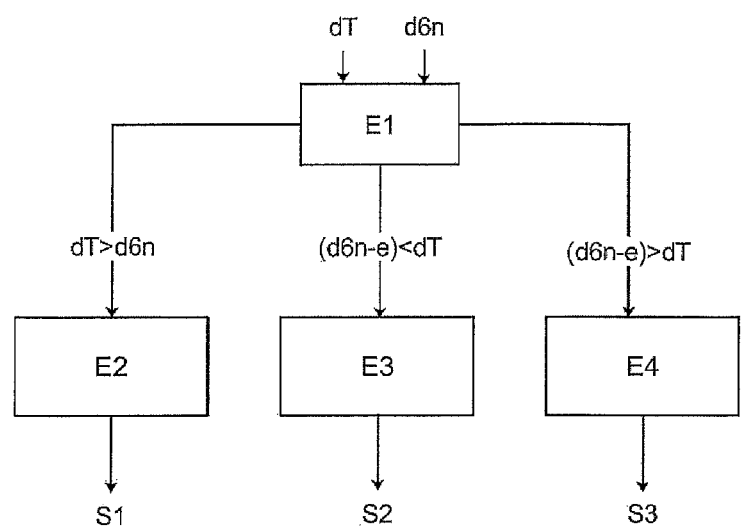
FIG. 8 is a schematic representation of the steps for implementing a method for using a system for conditioning fuel.

Operating Procedure (FIG. 8)

An embodiment of the invention will be presented in reference to FIG. 8. In this example, the pump 1 and the auxiliary power generation device 2 are both operating at a predetermined high efficiency constant speed. Thus, their operation is optimized. This thus allows for the use of a pump 1 and an auxiliary power generating device 2 with simple designs and reduced costs as they do not have to operate over a large operating range. This is particularly advantageous for a fuel cell the efficiency of which is optimal over a low speed range. Preferably, the flow rate of the pump 1 is chosen in an intermediate range between the minimum flow rate and the maximum flow rate required by the main turbomachine T and the auxiliary power generation device 2 over the operating range.

In this example, the nominal supply flow rate don is lower than the setpoint flow rate of the turbomachine dT in the take-off phase S1 and higher than the setpoint flow rate of the turbomachine dT in the cruising phase S2.

In reference to FIGS. 3 and 8, the method comprises a step E1 consisting of comparing the nominal supply flow rate don to the setpoint flow rate of the turbomachine dT.

During the take-off phase S1, the flow rate setpoint dT is higher than the nominal supply flow rate don, the method comprises a step E2 consisting of opening the second valve V2 to distribute the fuel from the buffer tank 4 and closing the first valve V1. Thus, the buffer tank 4 provides an outlet flow rate d4s that is added to the nominal supply flow rate d6n.

During the cruise phase S2, the setpoint flow rate dT is lower than the nominal supply flow rate don. The method comprises a step E3 consisting of closing the second valve V2 and opening the first valve V1 according to a first degree of opening so as to gradually fill the buffer tank 4 with the surplus flow.

During the landing phase S3, the setpoint flow rate dT is lower than the nominal supply flow rate don. The method comprises a step E4 consisting of closing the second valve V2 and opening the first valve V1 according to a second degree of opening so as to rapidly fill the buffer tank 4 with the surplus flow.

Advantageously, the mechanical/electrical power of the auxiliary power generation device 2 may be used as shown in FIG. 7.

Thanks to the invention, the fuel Q is conveniently packaged with high efficiency, enabling the use of optimized and reliable equipment with a reduced operating range. During the take-off phase S1, the buffer tank 4 allows heated fuel to be quickly and conveniently mobilized.

The invention claimed is:

1. A system for conditioning fuel configured to supply a main turbomachine of an aircraft, with fuel from a cryogenic tank, the main turbomachine having a setpoint flow rate of fuel, which is according to the phase of movement of the aircraft, the conditioning system comprising:
    a fuel circuit connected at the inlet to the cryogenic tank and at an outlet to the main turbomachine,
    a pump configured to circulate a fuel flow from upstream to downstream in the fuel circuit, the pump being configured to operate at a predetermined constant speed,
    at least one heat exchanger configured to transmit calories from a hot source to the fuel flow via a heating circuit,
    a supply member of the main turbomachine with a fuel flow, the supply member defining a predetermined flow cross-section, the supply member being configured to provide a nominal supply flow rate when the pump operates at a predetermined constant speed,
    at least one buffer tank configured to supply the main turbomachine parallel to the supply member, the buffer tank being configured to be supplied by a fuel flow,
    at least one first valve for controlling the supply of the fuel flow to the buffer tank,
    at least one second valve for controlling the distribution of the fuel flow from the buffer tank, and
    a regulating device configured to open the second valve when the setpoint flow rate is higher than the nominal supply flow rate.

2. The system for conditioning fuel according to claim 1, wherein the regulating device is configured to close the second valve when the setpoint flow rate is lower than the nominal supply flow rate.

3. The system for conditioning fuel according to claim 1, wherein the regulating device is configured to close the first valve when the setpoint flow rate is higher than the nominal supply flow rate.

4. The system for conditioning fuel according to claim 1, wherein, the first valve having a configurable degree of opening, the regulating device is configured to vary the degree of opening of the first valve according to a comparison between the nominal supply flow rate and the setpoint flow rate.

5. The system for conditioning fuel according to claim 1, further comprising at least one auxiliary heat exchanger mounted between the second valve and the main turbomachine so as to heat the fuel flow prior to the fuel flow being injected into the main turbomachine.

6. The system for conditioning fuel according to claim 1, wherein the hot source is an auxiliary power generation device supplied by the fuel circuit.

7. The system for conditioning fuel according to claim 6, wherein the auxiliary power generation device is configured to operate at a constant speed.

8. The system for conditioning fuel according to claim 6, wherein the auxiliary power generation device is at least one of an auxiliary turbomachine and a fuel cell.

9. The system for conditioning fuel according to claim 6, further comprising at least one propulsion member and a drive system of said propulsion member, the drive system being configured to be supplied by the main turbomachine and by the auxiliary power generation device.

10. The system for conditioning fuel according to claim 1, wherein the fuel is dihydrogen.

11. The system for conditioning fuel according to claim 1, wherein the nominal supply flow rate is determined to be higher than the setpoint flow rate in a cruising phase and lower than the setpoint flow rate in a take-off phase.

12. A method for supplying fuel from a cryogenic tank of an aircraft to a main turbomachine of the aircraft, the main turbomachine having a setpoint flow rate of fuel, which is according to a movement phase of the aircraft, the method comprising the steps of:
    circulating a fuel flow from upstream to downstream in a fuel circuit by means of a pump operating at a predetermined constant speed, the pump providing a nominal supply flow rate by using a supply member,
    transmitting calories from a hot source to the fuel flow via a heating circuit, and
    emptying a buffer tank, supplied by the fuel circuit, when the setpoint flow rate is higher than the nominal supply flow rate to supply the main turbomachine in parallel with the supply member.

* * * * *